(12) United States Patent
Gao

(10) Patent No.: US 6,912,466 B1
(45) Date of Patent: Jun. 28, 2005

(54) METHOD FOR IMAGING SEISMIC STRUCTURES

(75) Inventor: Dengliang Gao, Houston, TX (US)

(73) Assignee: Marothon Oil Company, Houston, TX (US)

( * ) Notice: Subject to any disclaimer, the term of this patent is extended or adjusted under 35 U.S.C. 154(b) by 25 days.

(21) Appl. No.: 10/434,031

(22) Filed: May 8, 2003

(51) Int. Cl.$^7$ ............................................... G01V 1/28
(52) U.S. Cl. ........................................... 702/14; 367/73
(58) Field of Search ............................ 702/11, 14, 16, 702/66, 67, 70, 71, 74–77, 179, 180, 183, 187, 189; 367/14, 5, 21, 36, 38, 47, 49, 73, 15; 324/323, 347–350

(56) References Cited

U.S. PATENT DOCUMENTS 5,757,722 A * 5/1998 Zinn ........................... 367/19

6,754,591 B1 * 6/2004 Herkenhoff et al. .......... 702/14

* cited by examiner

*Primary Examiner*—Marc S. Hoff
*Assistant Examiner*—Mohamed Charioui
(74) *Attorney, Agent, or Firm*—Jack E. Ebel

(57) ABSTRACT

A process for displaying seismic data that compares the data to a model function, typically a trigonometric sine wave. Sample points from the model function are compared to sample points of the seismic data at each graphic point being displayed. Seismic sample data for each graphic point, along with seismic data from neighboring graphic points, is correlated to sample data from the model function to produce a regression gradient for the graphic point. The absolute value of the regression gradient is displayed graphically at the graphic point location, using a gray scale. The correlation is performed by regressing the seismic data sample points with sample points from the model function using a least squares technique to determine the regression gradient for the graphic point.

10 Claims, 8 Drawing Sheets

US 6,912,466 B1

METHOD FOR IMAGING SEISMIC STRUCTURES

TECHNICAL FIELD

This invention relates to seismic data and more particularly to analysis of seismic graphical data. Even more particularly, the invention relates to transformation of reflection amplitude data into a geologically more interpretable structure data.

BACKGROUND OF THE INVENTION

Structural interpretation of seismic images is a process involving an interpreter recognizing the temporal and spatial relationships of reflection events of wiggle traces shown on vertical sections and horizontal slices. Thus a robust structural interpretation requires reliance on imaging critical reflection events of regular amplitude wiggle traces, and on an interpreter's ability to identify such events.

Although attempts have been made to enhance structural features by extracting seismic texture attributes, most attribute extraction algorithms "destroy" the valuable phase information of reflection wiggle traces, and such information is critical to structural visualization and interpretation. For example, the coherence cube is effective in highlighting faults and other geological boundaries. However, such enhancement is achieved at the expense of sacrificing the structurally valuable phase information of wiggle traces. For this reason, the coherence cube has significantly limited an interpreter's ability for structural geometry and kinematic analysis, a fundamental component of robust structural interpretation and successful hydrocarbon exploration.

Regular image processing, such as edge enhancement, frequency filter, and color editing for phase and amplitude, have been effective in enhancing structural features. For example, a color mapping function, defined by a symmetrical increase of gray level from black at zero-crossing to white at both peak and trough, is particularly effective in enhancing the visibility of zero-crossings of the wiggle trace and thus is helpful in visualizing structural fabrics; however, all these operations are just visual enhancement of amplitude samples and little pattern discriminatory analysis is performed for improved structural visualization and interpretation.

It is thus apparent that there is a need in the art for an improved method of analyzing seismic data to better delineate structural geometry and better understand kinematics of deformational fabrics in the subsurface. The present invention meets these and other needs in the art.

DISCLOSURE OF INVENTION

It is an aspect of the present invention to analyze seismic data.

It is another aspect of the invention to transform a seismic amplitude volume into a geologically more interpretable structure cube.

Another aspect of the invention is to compare an array of amplitude samples at each sample location of the seismic data volume to the samples of a model function and produce an absolute regression gradient value that is stored in a structure cube and displayed.

The above and other aspects of the invention are accomplished in a system that regresses seismic data to a model function, defined by a trigonometric function, typically a full cycle of a sine function. The system selects a frequency for the model function, and regresses sample points from the model function to sample points of the seismic data at each sample location being displayed. The resulting absolute value of regression gradient is displayed graphically at the corresponding sample location in the structure cube, using a gray scale. The regression is performed by using a least squares technique.

DESCRIPTION OF THE DRAWINGS

The above and other aspects, features, and advantages of the invention will be better understood by reading the following more particular description of the invention, presented in conjunction with the following drawings, wherein.

THE INVENTION

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
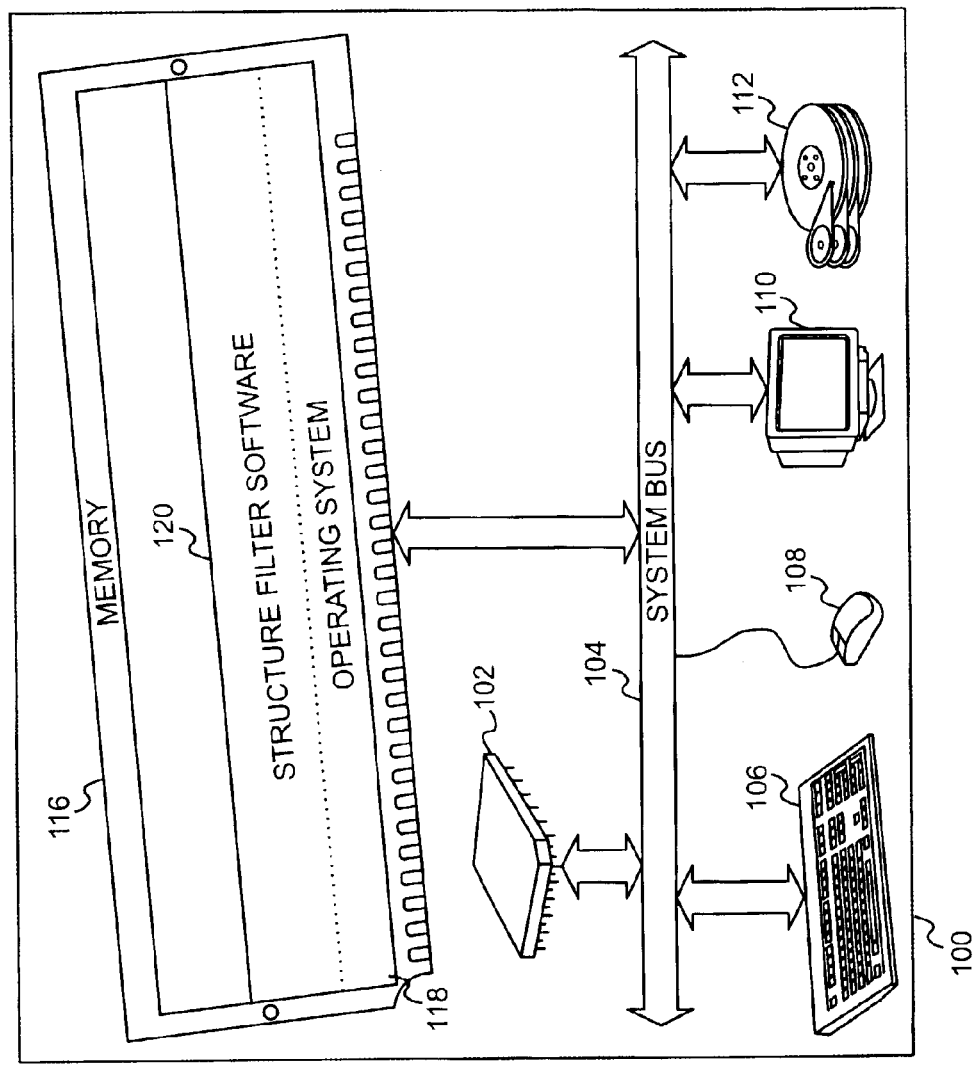
FIG. 1 shows a block diagram of a computer system incorporating the present invention.

FIG. 1 shows a block diagram of a computer system incorporating the seismic display and analysis software of the present invention. Referring to FIG. 1, a computer system 100 contains a processor 102 that communicates to other elements of the computer system 100 over a system bus 104. A keyboard 106 allows a user of the computer system 100 to enter command lines and input parameters such as frequency, size, and dimension of the model function. A graphical selection device 108 allows the user to select seismic data and computer programs of the present invention using the graphic user interface (GUI) of a commercialized data visualization system. A display device 110 allows software of the present invention within the computer system 100 to display original seismic data and data created from the present invention to the user. A storage device 112 stores the software and seismic data used within the computer system 100.

A memory 116 contains an operating system 118, which is typically the Unix operating system or the Microsoft Windows operating system. Seismic display and analysis software 120, of the present invention, analyzes seismic data retrieved from the storage device 112 and displays the results on the display device 110, all in response to commands and processing parameters such as frequency, size, and dimension of the model function entered by the user using the keyboard 106 and the graphical input device 108 using the GUI.

Figure 2:
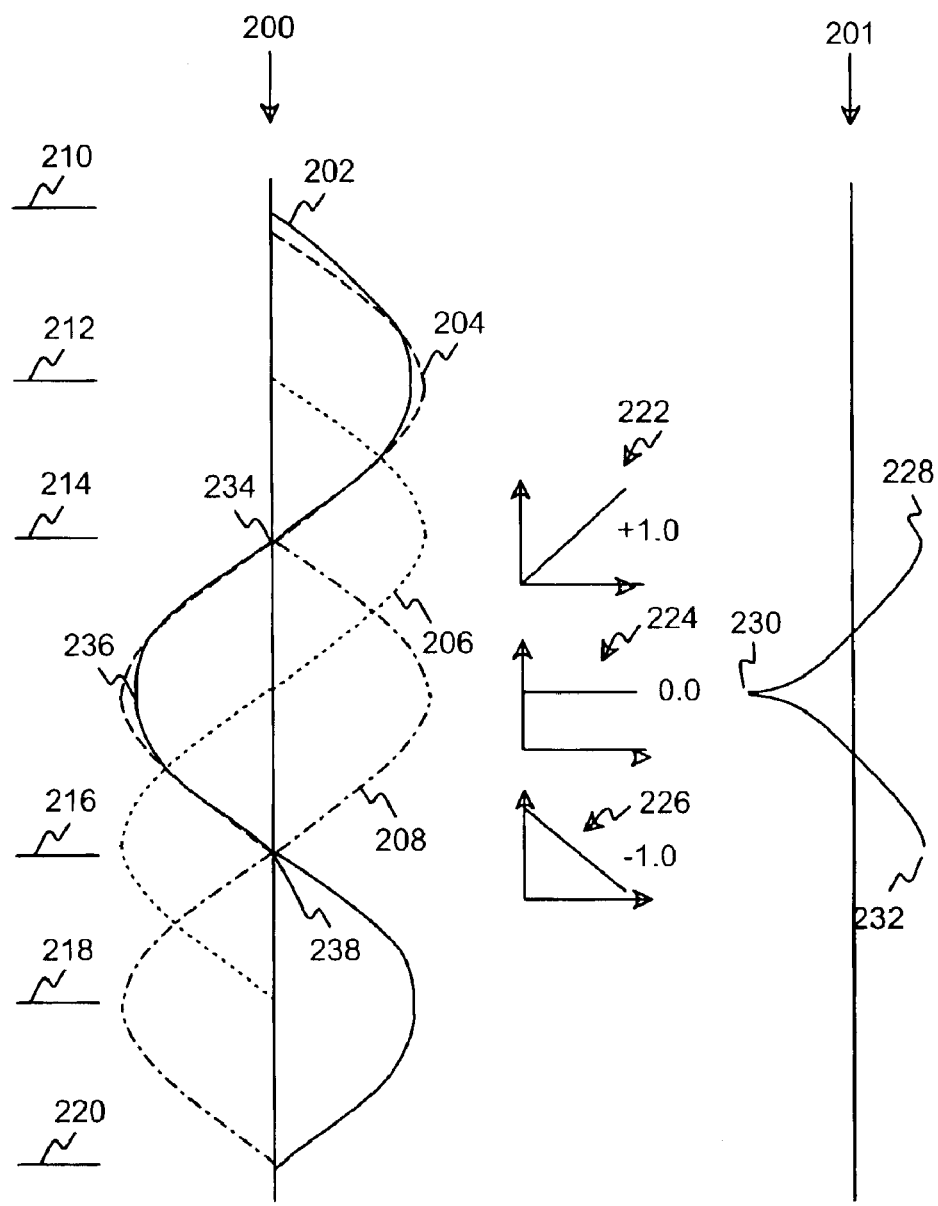
FIG. 2 illustrates schematically the fundamental process of the present invention.

FIG. 2 illustrates regressing the model function to the seismic data on a single trace. Referring to FIG. 2, diagram 200 shows a solid line 202, which represents seismic data being processed by the invention. In this example, the seismic data trace appears to be a regular, smooth wiggle trace that is nearly a trigonometric sine function. Such a schematic wiggle trace is used simply for the sake of convenience for this description. Actual seismic data may be much more irregular, variable, and complex, and multiple traces may be involved in actual processing, depending on the initial selection of the size and dimension of the model.

Dashed line 204 shows a snapshot of the model function while it is moving down the data trace. The model function in this example is a full cycle of a trigonometric sine function having a frequency nearly equal to the dominant frequency of the seismic data.

Lines 210, 212, 214, 216, 218, and 220 represent time/depth reference points on the seismic data, thus the distance from point 210 to point 216 is one complete cycle of the seismic data.

To establish display data for one specific sample location, seismic data from location 210 through location 216 on diagram 200 is correlated to the model function 204. The regression result is shown as a vector diagram 222, which indicates that the regression gradient has substantially a value of "+1", the highest possible value of the regression gradient. This value is represented in the output file as point 228 on the output diagram 201, and is displayed at the sample location corresponding to the central location 234 of one cycle of the model trace 204.

At another sample location while the model is continuously moving down the seismic data trace, seismic data from location 212 through location 218 on diagram 200 is regressed to the model function, which is represented by dotted line 206. The regression result is shown as a vector diagram 224, which indicates that the regression gradient has substantially a value of "0". This value is represented in the output file as point 230 on the output diagram 201, and is displayed at the sample location corresponding to the central location 236 of one cycle of the model trace 206.

Similarly, at another sample location while the model is continuously moving down the seismic data trace, seismic data segment starting at reference point 214 through location 220 on diagram 200 is regressed to the model, which is represented by dash-dot line 208. The regression result is shown as a vector diagram 226, which indicates that the regression gradient has substantially a value of "−1", the lowest possible value of the regression gradient. The absolute value of the regression gradient is placed in the output file as point 232 on the output diagram 201, and is displayed at the sample location corresponding to the central location 238 of one cycle of the model trace 208.

These are just three snapshot example locations to show that the model moves continuously down a wiggle trace and then on to subsequent traces until all the sample locations on all the traces of the seismic volume are processed to create a regression gradient volume, which is called a structure cube.

Figure 3:
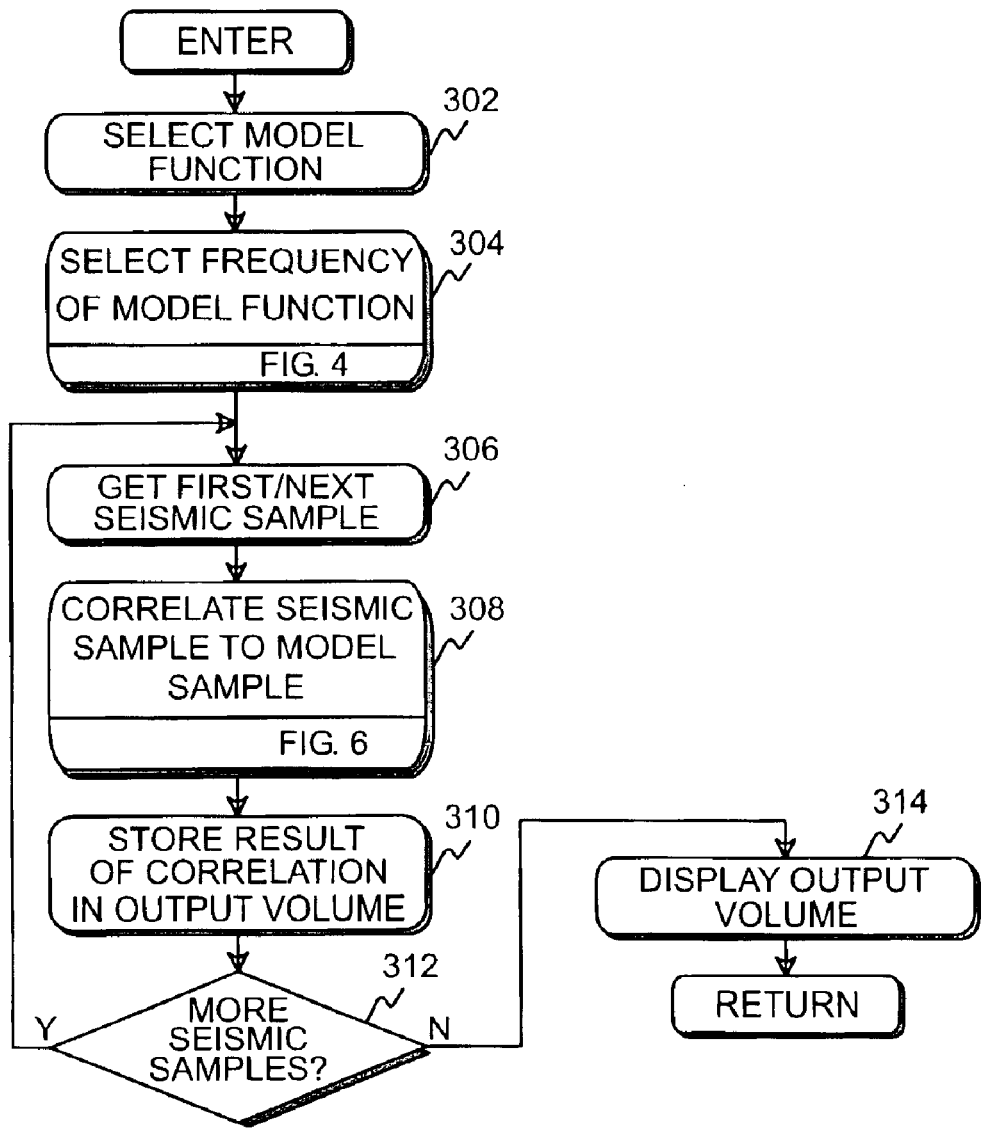
FIG. 3 shows a flowchart of the top level logic of the invention.

FIG. 3 shows a flowchart of the top level logic of the invention. Referring to FIG. 3, when the software of the invention is started by a user, control enters at step 302. Step 302 selects a model for use with the data. Here a trigonometric sine function is used as the base function of the model. Step 304 calls FIG. 4 to select the frequency of the model function for use in the method.

Figure 4:
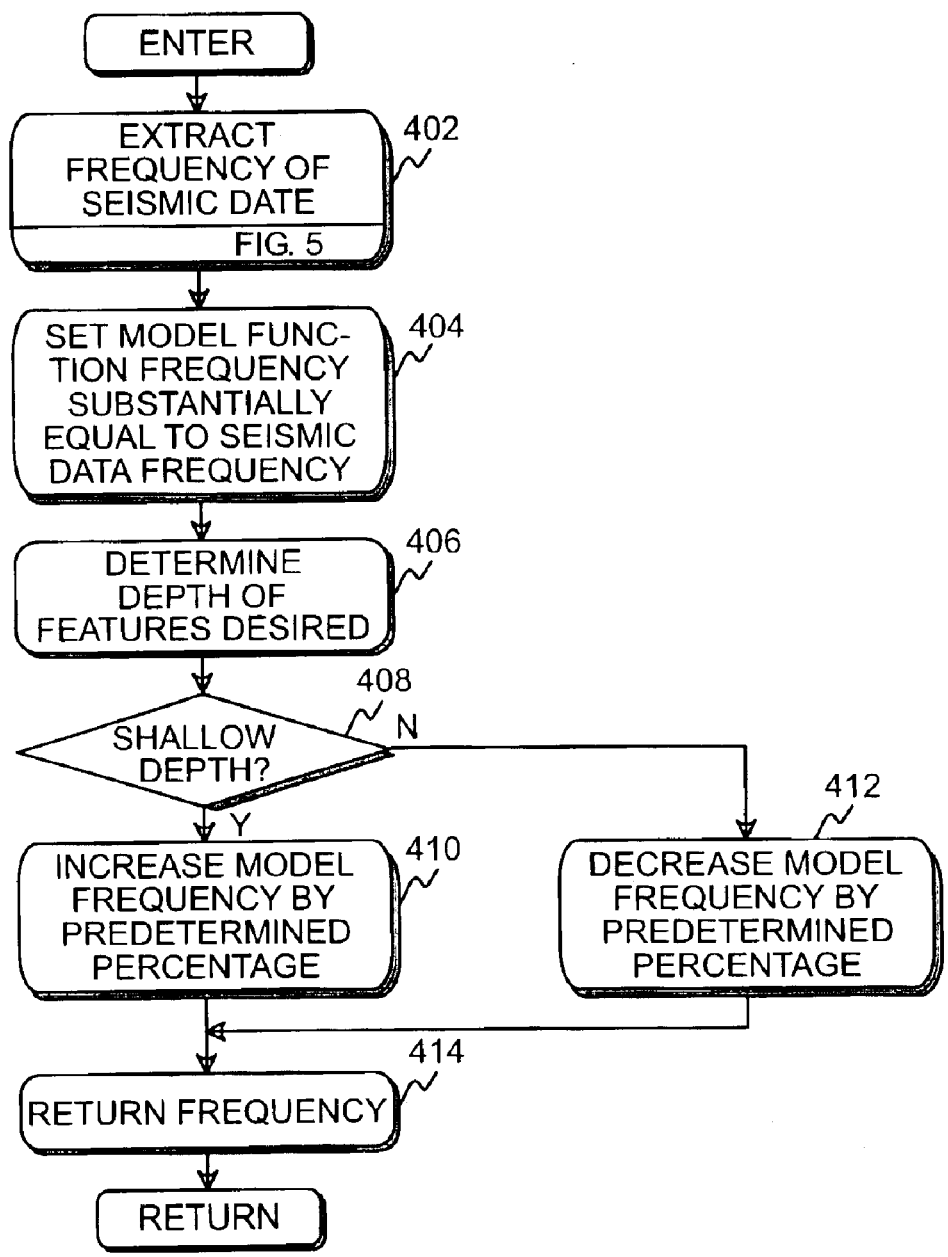
FIG. 4 shows a flowchart of the select model function frequency.
Figure 6:
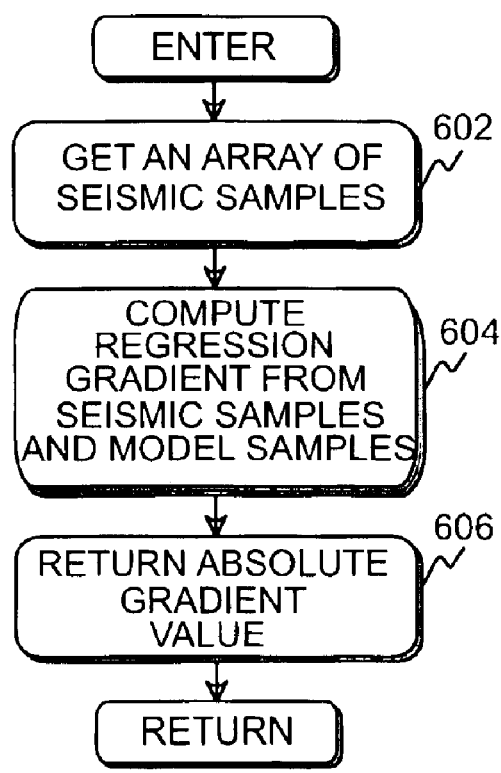
FIG. 6 shows a flowchart of the regression process.

After returning from FIG. 4, step 306 gets the first, or next, sample of seismic data, and step 308 calls FIG. 6 to correlate this sample with the model function. After returning from FIG. 6, step 310 stores the regression gradient value into the output volume. Step 312 then determines if there are additional seismic samples, and, if so, control returns to step 306 to process the next sample.

After all seismic samples have been processed, control goes to step 314 which displays the output volume on display device 110 (FIG. 1) for subsequent interpretation.

FIG. 4 shows the process of determining a frequency for the model function to use in the method. Referring to FIG. 4, after entry, step 402 calls FIG. 5 to determine the frequency of the seismic data. After returning from FIG. 5, step 404 sets the frequency of the model function substantially equal to the frequency of the seismic data. Step 406 then determines the depth of the features being examined. After determining the depth of the features being examined, step 408 determines whether the depth is a shallow depth, which is typically less than a 2.0 seconds round-trip travel time or depth equivalent below the surface of the earth or below the seafloor. If shallow features are being examined, control goes to step 410 which increases the frequency of the model by a predetermined percentage, typically 150%, to be compatible with the increased dominant frequency at shallow depth. Control then goes to step 414 which returns the frequency to FIG. 3.

If the features being examined are located deep in the formation, typically below 2.0 seconds of the surface or seafloor, step 408 transfers control to step 412, which decreases the frequency of the model function by a predetermined percentage, typically 70%, to be compatible with the decreased dominant frequency at depth. Control then goes to step 414, which returns the selected frequency to FIG. 3.

Figure 5:
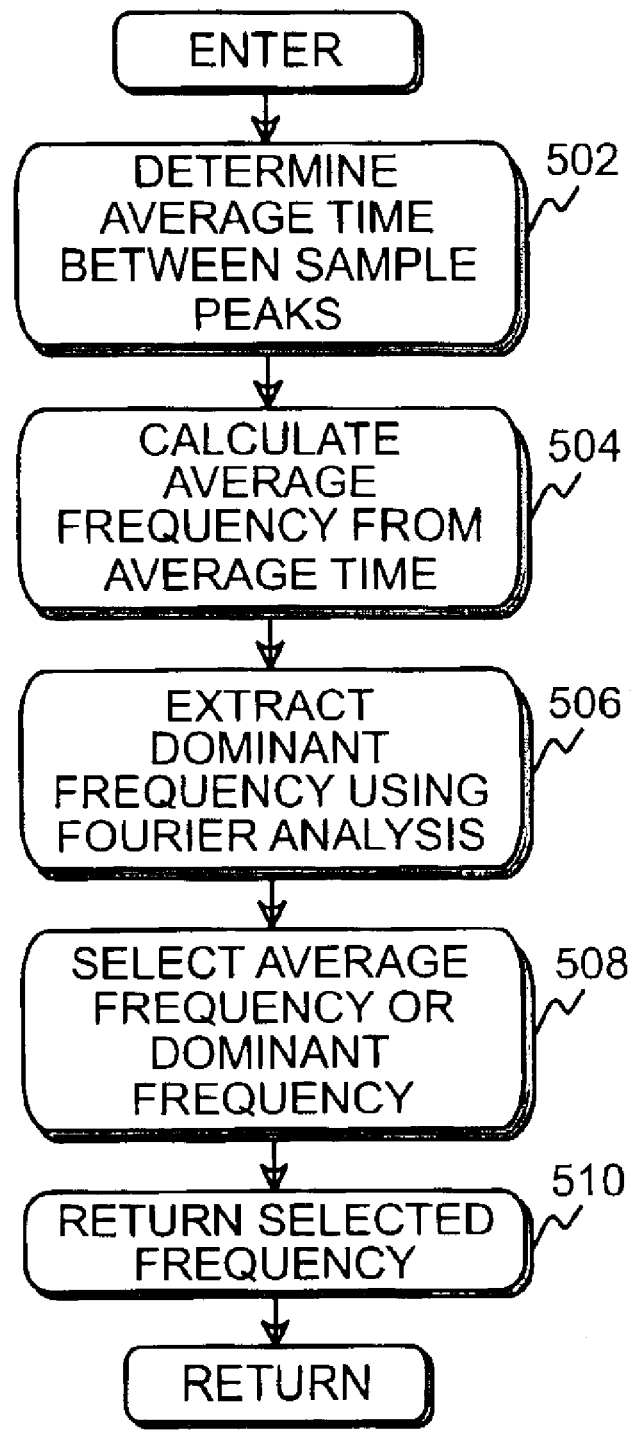
FIG. 5 shows a flowchart of the extract seismic data frequency.

FIG. 5 shows a flowchart of the process of estimating the frequency of the seismic data. Referring to FIG. 5, after entry, step 502 determines the average time/depth between sample peaks or troughs of a seismic wiggle trace in the area or interval of interest. Step 504 then calculates the average frequency from the average time/depth.

Alternatively, step 506 uses a Fourier analysis to transform the seismic trace data from time/depth domain to frequency domain to extract the dominant frequency from the seismic data.

Step 508 selects one of the two frequencies determined in steps 504 and 506. Typically only the method of step 504 or the method of step 506 would be used, since either one can arrive at a frequency for the data. In practice, a user may select which method is used. After the frequency is determined, step 510 returns the frequency to FIG. 4.

FIG. 6 shows a flowchart of the process of regressing the sample points of seismic data and the sample points of the model at a particular sample location. Referring to FIG. 6, after entry, step 602 retrieves 2n+1 sample points at the sample location being processed, which includes n samples above and below plus the sample itself, to be regressed with the model that has the same number of sample points as the data sample points.

Step 604 then correlates the sample points of the seismic data retrieved in step 602 with the sample points of the model function using the following equation:

$$\lambda = (abs) \frac{\sum_{i=1}^{n}(x_i - \bar{x})(y_i - \bar{y})}{\sum_{i=1}^{n}(x_i - \bar{x})^2}$$

where $\lambda$ is the regression gradient, "abs" denotes the absolute value, n is the number of samples of the model function, $x_i$ are the amplitude samples of the model, $\bar{x}$ is the mean value of the model function, $y_i$ are the amplitude samples of seismic data at a given location, and $\bar{y}$ is the mean value of seismic data at the location.

Step 606 returns the regression gradient value $\lambda$ to FIG. 3.

Figure 7A:
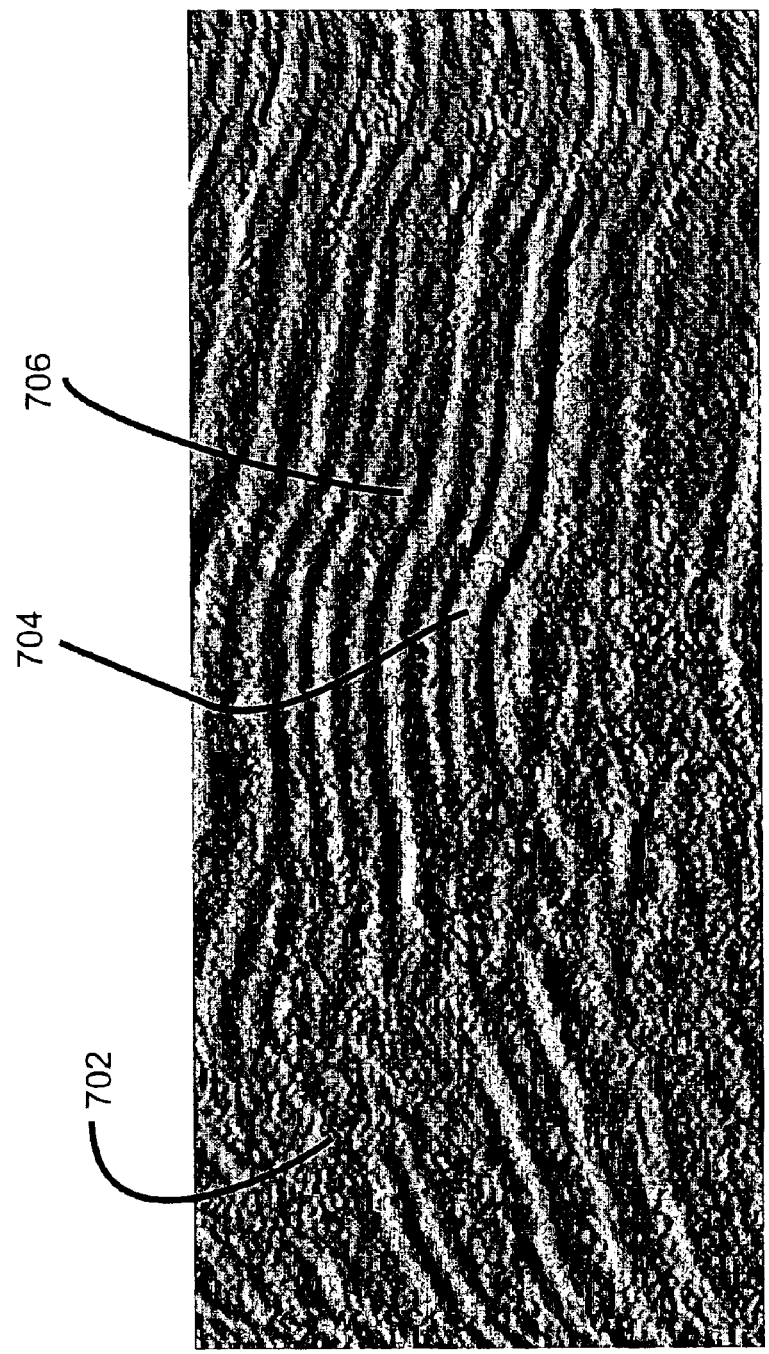
FIGS. 7A and 7B show original seismic data and data after being processed by the invention.
Figure 7B:
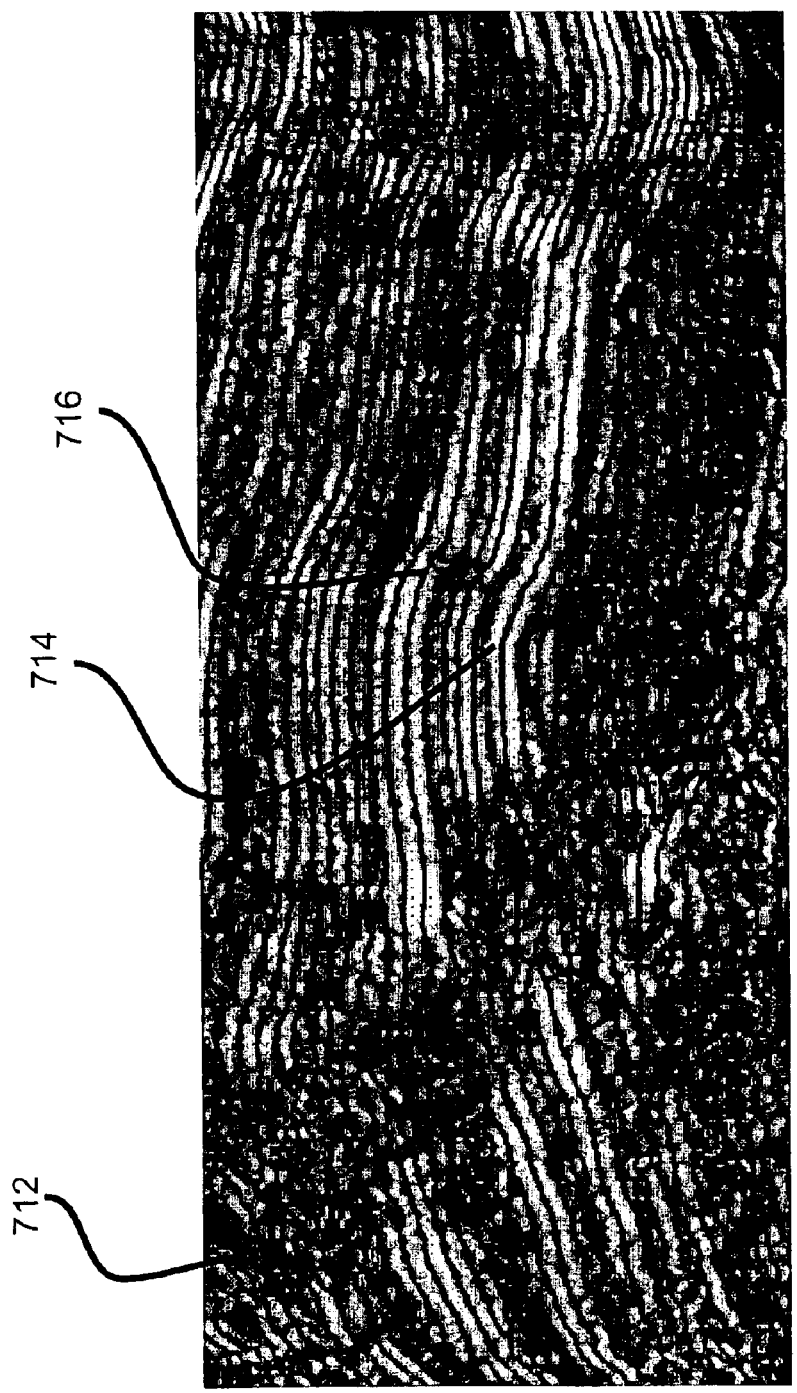

FIG. 7 is an example illustrating the advantages of using the method of the present invention. FIG. 7A shows an example of original seismic data displayed using a conventional amplitude wiggle trace display method. FIG. 7B shows this same seismic section after the original data has been processed using the model regression method of the present invention. Reference 702 indicates a master fault, and reference 712 shows the master fault after the data has been processed by the invention. Reference 704 points to a fault-bend fold, and reference 714 points to this same geologic feature in the processed data. Reference 706 points to a fault, and reference 716 shows this same fault in the processed data, where it is better illustrated.

Having thus described a presently preferred embodiment of the present invention, it will be understood by those skilled in the art that many changes in construction and geometry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method for analyzing and displaying seismic graphical data, said method comprising the steps of:

(a) selecting a model function for said analyzing;

(b) determining a frequency of said seismic graphical data;

(c) setting a frequency for said model function substantially equal to said frequency determined in step (b);

(d) selecting a sample location from a plurality of sample locations within said seismic graphical data, and retrieve a plurality of data samples centered at said sample location, wherein a number of samples retrieved is equal to the number of samples of said model function selected in step (a);

(e) regressing the data samples retrieved at said sample location selected in step (d) to said model function to produce a regression gradient value;

(f) storing and displaying said regression gradient value at the corresponding sample location; and (g) repeating steps (d) through (f) for each sample location of said plurality of sample locations.

2. The method of claim 1 wherein step (c) further comprises the steps performed after step (d):

(c1) determining a mean amplitude value of the model function;

(c2) determining a mean amplitude value of the selected seismic data; and (c3) determining the gradient of the regression line using a least squares method.

3. The method of claim 2 wherein the least square technique of step (c3) further comprises:

(c3a) performing the least squares method using the equation $$\lambda = \frac{\sum_{i=1}^{n}(x_i - \bar{x})(y_i - \bar{y})}{\sum_{i=1}^{n}(x_i - \bar{x})^2}$$

where $\lambda$ is the regression gradient, n is the number of samples of the model function, $x_i$ are the amplitude samples of the model function, $\bar{x}$ is the mean value or the model function, $y_i$ are the amplitude samples of seismic data at the location, and $\bar{y}$ is the mean value of seismic data at the location.

4. The method or claim 1 wherein step (b) further comprises the step of:

(b1) determining a first peak of said seismic graphical data;

(b2) determining a second peak of said seismic graphical data, wherein said second peak occurs immediately after said first peak;

(b3) determining a time difference between said first and second peaks;

(b4) repeating steps (b1) through (b3) a predetermined number of times;

(b5) averaging said sample time differences determined in step (b4) to produce an average sample time difference; and (b6) determining an average frequency of said seismic graphical data from said average sample time difference.

5. The method of claim 1, wherein step (b) further comprises the steps of:

(b1) performing a Fourier analysis of said seismic graphical data; and (b2) selecting a dominant frequency from said Fourier analysis as said frequency of said seismic graphical data.

6. The method of claim 1 wherein step (c) further comprises the steps of:

(c1) when features being examined within said seismic graphical data are located above a predetermined depth, increasing said frequency of said model function by a predetermined percentage; and (c2) when features being examined within said seismic graphical data are located below said predetermined depth, decreasing said frequency of said model function by said predetermined percentage.

7. The method of claim 1 wherein step (f) further comprises the steps of:

(f1) when the gradient of the regression line is negative, displaying said regression gradient value as an absolute value; and (f2) displaying said regression gradient value using grayscale with black denoting a lowest gradient value and white a highest gradient value.

8. A method for analyzing and displaying graphical data, said method comprising the steps of:

(a) selecting a model function for said analyzing;

(b) determining a frequency of said graphical data;

(c) setting a frequency for said model function substantially equal to said frequency determined in step (b);

(d) selecting a sample location from a plurality of sample locations within said graphical data;

(e) retrieving a plurality of data samples centered at said sample location, wherein a number of samples retrieved is equal to a number of samples of said model function;

(f) regressing the data samples retrieved in step (e) to said model function to produce a regression gradient value;

(g) storing and displaying said regression gradient value at a location of said sample; and (h) repeating steps (d) through (g) for each sample location of said plurality of sample locations.

9. The method of claim 8 wherein step (b) further comprises the step of:

(b1) determining a first peak of said graphical data;

(b2) determining a second peak of said graphical data, wherein said second peak occurs immediately after said first peak;

(b3) determining a distance between said first and second peaks;

(b4) repeating step (b1) through (b3) a predetermined number of times;

(b5) averaging said sample distances determined in step (b4) to produce an average sample distance difference; and (b6) determining an average frequency of said graphical data from said average sample distance difference.

10. The method of claim 8, wherein step (b) further comprises the steps of:

(b1) performing a Fourier analysis of said graphical data; and (b2) selecting a dominant frequency from said Fourier analysis as said frequency of said graphical data.

* * * * *

UNITED STATES PATENT AND TRADEMARK OFFICE
CERTIFICATE OF CORRECTION

PATENT NO. : 6,912,466 B1
DATED : June 28, 2005
INVENTOR(S) : Dengliang Gao

It is certified that error appears in the above-identified patent and that said Letters Patent is hereby corrected as shown below:

<u>Title page,</u>
Item [73], Assignee, replace "Marothon Oil Company, Houston, TX (US)" with
-- Marathon Oil Company, Houston, TX (US) --.

Signed and Sealed this

Ninth Day of May, 2006

JON W. DUDAS
*Director of the United States Patent and Trademark Office*